US008506381B2

(12) United States Patent
Shiraishi

(10) Patent No.: US 8,506,381 B2
(45) Date of Patent: Aug. 13, 2013

(54) GAMING MACHINE

(75) Inventor: Kazutaka Shiraishi, Tokyo (JP)

(73) Assignee: Konami Gaming, Incorporated, Las Vegas, NV (US)

( * ) Notice: Subject to any disclaimer, the term of this patent is extended or adjusted under 35 U.S.C. 154(b) by 764 days.

(21) Appl. No.: 12/619,316

(22) Filed: Nov. 16, 2009

(65) Prior Publication Data

US 2011/0117986 A1 May 19, 2011

(51) Int. Cl.
*A63F 9/24* (2006.01)
*A63F 13/00* (2006.01)

(52) U.S. Cl.
USPC .................. 463/20; 463/16; 463/17; 463/21; 463/22; 463/42; 273/138.1; 273/138.2; 273/143 R

(58) Field of Classification Search
USPC .... 463/16, 17, 20–21, 25, 29, 42; 273/138.1, 273/138.2, 143 R
See application file for complete search history.

(56) References Cited

U.S. PATENT DOCUMENTS

| | | | | |
|---|---|---|---|---|
| 4,798,387 | A | 1/1989 | Richardson | |
| 6,769,986 | B2 * | 8/2004 | Vancura | 463/30 |
| 6,893,018 | B2 | 5/2005 | Inoue | |
| 7,011,581 | B2 | 3/2006 | Cole et al. | |
| 7,179,169 | B2 * | 2/2007 | Beaulieu et al. | 463/25 |
| 7,223,172 | B2 * | 5/2007 | Baerlocher et al. | 463/16 |
| 7,425,177 | B2 | 9/2008 | Rodgers et al. | |
| 7,431,649 | B2 | 10/2008 | Webb et al. | |
| 7,591,723 | B2 * | 9/2009 | Cregan et al. | 463/16 |
| 7,625,278 | B2 * | 12/2009 | Paulsen et al. | 463/16 |
| 7,794,317 | B2 * | 9/2010 | Kaminkow et al. | 463/16 |
| 2003/0052447 | A1 | 3/2003 | Stewart | |
| 2003/0060281 | A1 * | 3/2003 | Vancura | 463/30 |
| 2004/0000754 | A1 | 1/2004 | Inoue | |
| 2004/0017041 | A1 | 1/2004 | Inoue | |
| 2005/0026673 | A1 * | 2/2005 | Paulsen et al. | 463/16 |
| 2005/0181867 | A1 | 8/2005 | Thomas et al. | |
| 2007/0010319 | A1 | 1/2007 | Lind et al. | |
| 2007/0054727 | A1 | 3/2007 | Garamendi et al. | |

(Continued)

FOREIGN PATENT DOCUMENTS

| | | |
|---|---|---|
| JP | 2004-024554 A | 1/2004 |
| JP | 2004-057221 A | 2/2004 |

OTHER PUBLICATIONS

International Search Report for the corresponding PCT application No. PCT/US10/56231.

(Continued)

*Primary Examiner* — Dmitry Suhol
*Assistant Examiner* — Ryan Hsu
(74) *Attorney, Agent, or Firm* — Leason Ellis LLP.

(57) ABSTRACT

A gaming machine includes a first lottery device which performs a lottery to determine an arrangement of option areas on a lottery field to be presented to a player, and a first presenting device which presents the determined arrangement. A second lottery device performs a lottery to draw a lottery position on the lottery field when the arrangement of each of the option areas has been determined by the first lottery device, and a second presenting device presents a lottery position based on a lottery result by the second lottery device. A dividend control device gives a dividend corresponding to a property of an option area, when the property of the option area is configured to yield the dividend and the option area satisfies a predetermined relationship with the lottery position drawn by the second lottery device.

14 Claims, 14 Drawing Sheets

(56) References Cited

U.S. PATENT DOCUMENTS

| | | | | |
|---|---|---|---|---|
| 2007/0135203 | A1 | 6/2007 | Nicely | |
| 2007/0265056 | A1 | 11/2007 | Yoshizawa | |
| 2008/0125204 | A1 * | 5/2008 | Inamura | 463/11 |
| 2008/0125205 | A1 * | 5/2008 | Inamura | 463/13 |
| 2009/0233682 | A1 | 9/2009 | Kato et al. | |

OTHER PUBLICATIONS

Australian Office Action mailed Feb. 7, 2012 for the corresponding Australian Application No. 2010241414 (previously submitted Oct, 9. 2012).

* cited by examiner

GAMING MACHINE

FIELD OF THE INVENTION

The present invention relates to a gaming machine that selects a lottery position on a lottery field in which option areas are arranged and determines a dividend to be given to a player according to a relationship between the selected result and the option areas.

BACKGROUND OF THE INVENTION

There is known a gaming machine in which a plurality of option areas whose dividends are different is arranged on a circular lottery field, an indicator rotates around the lottery field and stops at a suitable time, and a dividend in the option area indicated by the stopped indicator is paid to a player. For example, U.S. Pat. No. 7,431,649, which is incorporated by reference herein in its entirety, discloses a watering game including a wheel with a plurality of sections that are selectively activated to indicate a play result. U.S. Patent publication No. 2007/054727, which is incorporated by reference herein it its entirety, discloses a gambling device with a symbol display rotatable about horizontal and vertical axes. U.S. Patent Publication No. 2004/000754, which is incorporated by reference in its entirety, discloses a slot machine including a cylindrical reel including side and peripheral display surfaces. And U.S. Pat. No. 6,893,018, which is incorporated by reference herein in its entirety, discloses a game machine with multiple reels each independently executing a game result.

In such gaming machines, the arrangement of option areas is generally fixed on the lottery field. For this reason, such gaming machines have an inconvenience such that player's expectation for the lottery cannot be varied.

SUMMARY OF THE INVENTION

To solve the problem above, a gaming machine according to the present invention includes a first lottery device which performs a lottery to determine an arrangement of each of option areas with different properties on a lottery field to be presented to a player, a first presenting device which presents to the player the arrangement of each of the option areas determined in the lottery by the first lottery device, a second lottery device which performs a lottery to draw a lottery position on the lottery field in a state where the arrangement of each of the option areas is determined by the first lottery device, a second presenting device which presents to the player a state where the lottery position is determined based on a result of the lottery by the second lottery device, and a dividend control device which gives to the player a dividend corresponding to a property of an option area, when the property of the option area is configured to yield the dividend and the option area satisfies a predetermined relationship with the lottery position drawn by the second lottery device.

According to invention, since the gaming machine of the first lottery device the present performs the lottery to determine the arrangement of each of the option areas on the lottery field, the arrangement of each option area can be suitably changed when the second lottery device performs the lottery to draw the lottery position on the lottery field. For this reason, player's expectation for the lottery of a dividend can be variously changed, thereby providing the gaming machine having a lot of entertainments.

DETAILED DESCRIPTION OF THE INVENTION

Figure 1:
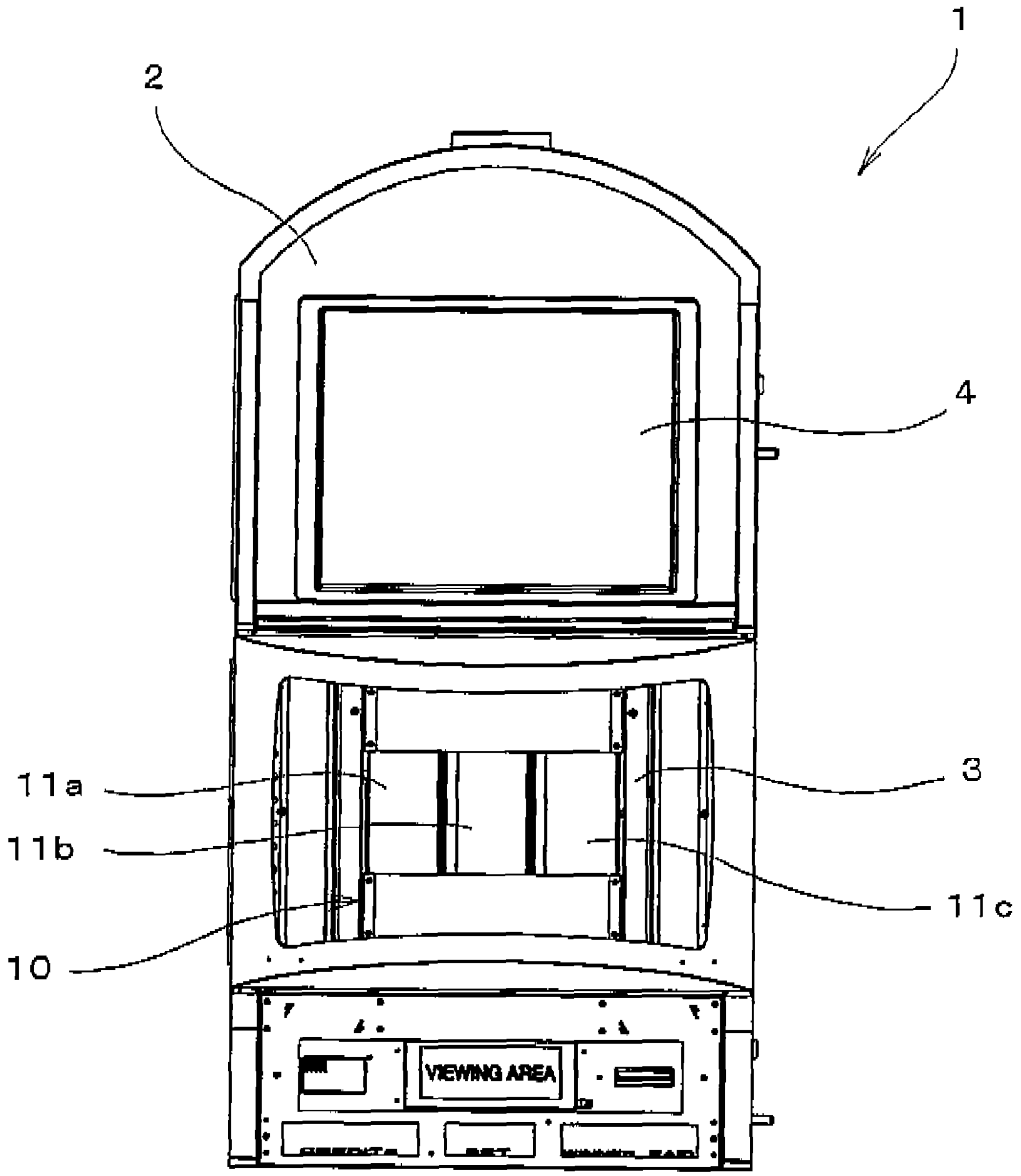
FIG. 1 is a front view showing a gaming machine in one state according to one embodiment of the present invention.

A gaming machine according to a preferred embodiment of the present invention is described below with reference to the drawings. As shown in FIG. 1, a gaming machine 1 has an upright console 2, a center unit 3 provided to a front center of the console 2, and an upper display device 4 provided to a front upper portion of the console 2. The center unit 3 has a generally cubic shape, and can horizontally rotate about a pivot shaft in a vertical direction. When the center unit 3 pivots, a physical reel device 10 shown in FIG. 1, a game board device 20 shown in FIG. 2 or a lighting board device 30 shown in FIG. 3 is selectively brought to the front surface of the gaming machine 1. An LCD (liquid crystal display device) is used as the upper display device 4.

The physical reel device 10 preferably has three physical reels 11*a*, 11*b* and 11*c* (hereinafter, they may be represented by a reference symbol 11) which are arranged in a right and left direction. The physical reels 11 can rotate independently about an axis in the right and left direction similarly to those of well-known slot machines. Although illustrations are omitted, predetermined numbers, designs, or the like are arranged on outer peripheries of the physical reels 11 with a predetermined arrangement. Combinations of the designs or the like, at the time when the physical reels 11 stop after rotating, determine the hits or misses in a game.

Figure 2:
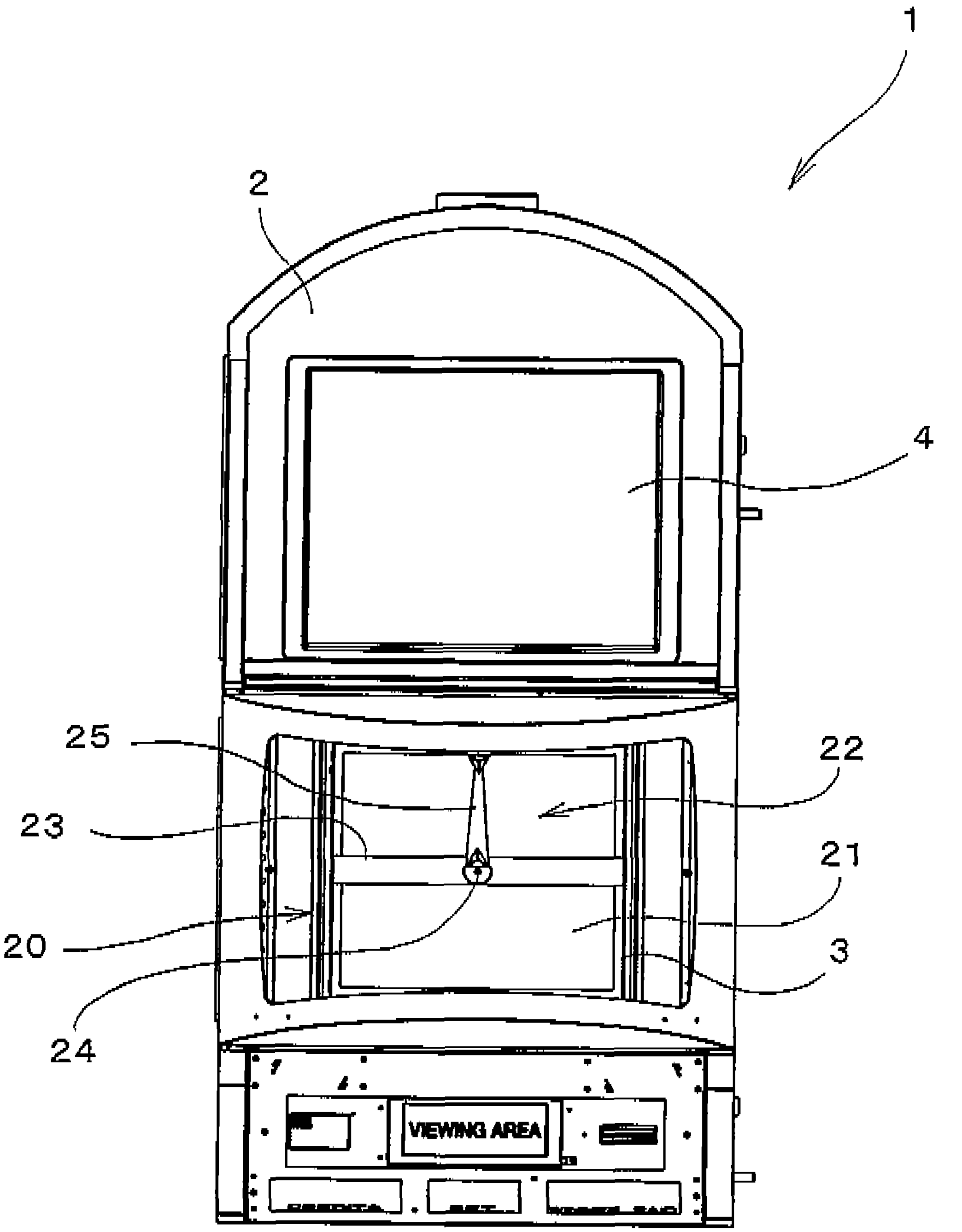
FIG. 2 is a front view of the gaming machine of FIG. 1 showing a state in which a center unit is turned to one direction from the state of FIG. 1.
Figure 3:
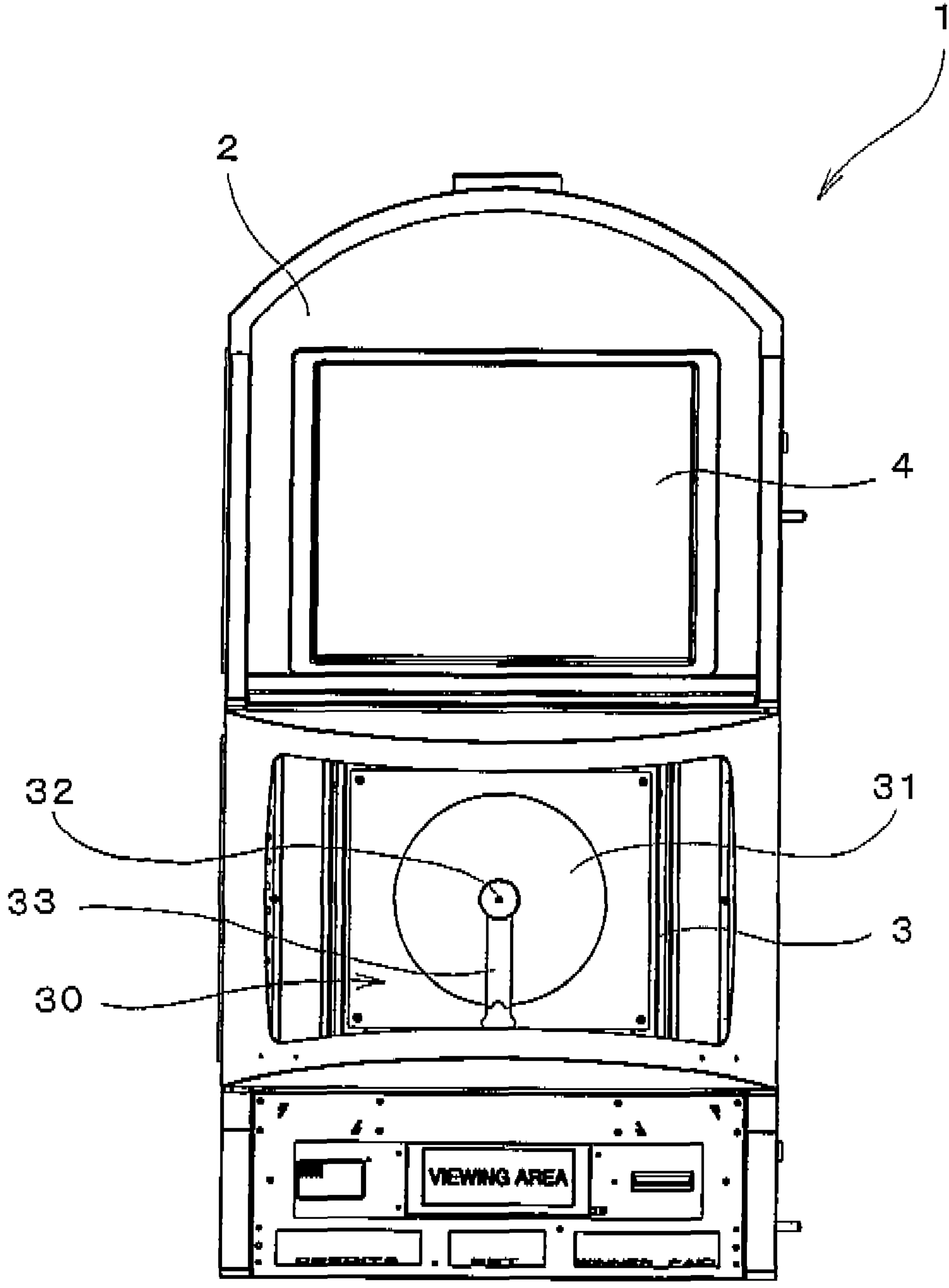
FIG. 3 is a front view of the gaming machine of FIG. 1 showing a state in which the center unit is turned to another direction from the state of FIG. 1.

The game board device 20 shown in FIG. 2 has a main display device 21 and an upper wheel device 22. For example, an LCD display may be provided as the main display device 21. The upper wheel device 22 has a bridge 23 which is arranged at a center portion of the main display device 21 with respect to an up and down direction thereof to traverse the center portion in the right and left direction, an indicator 25 which is provided to a center of the bridge 23 so as to be capable of rotating about a pivot shaft 24, and an actuator which drives to rotate the indicator 25 about the pivot shaft 24. The indicator 25 can rotate to right and left by 90°, taking a position shown in FIG. 2 as a criterion.

Figure 4:
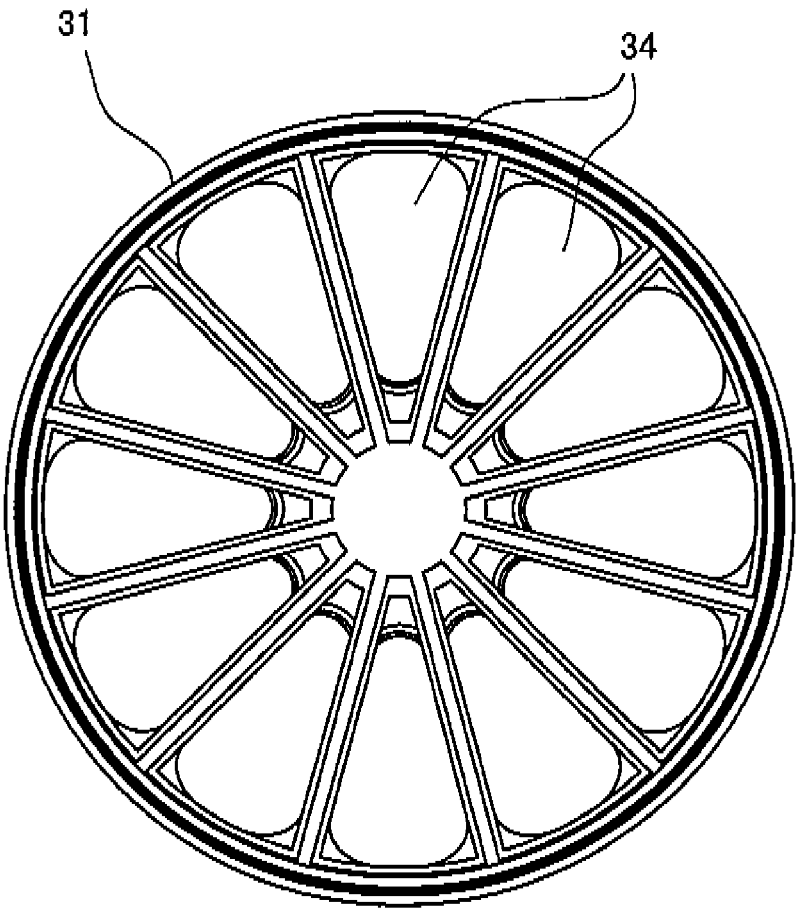
FIG. 4 is an enlarged view showing a lighting board of the gaming machine of FIG. 3.

The lighting board device 30 shown in FIG. 3 has a circular lighting board 31, an indicator 33 which is provided to a center of a lighting board 31 so as to be capable of rotating about a pivot shaft 32, and an actuator which drives to rotate the indicator 33 about the pivot shaft 32. The indicator 33 can rotate by 360° about the pivot shaft 32. As shown in FIG. 4, the lighting board 31 is preferably divided equally into twelve segments 34. Light sources such as LEDs may be embedded into each of the segments 34. As a result, the segments 34 are capable to individually emit light. Emission colors of the segments 34 can be switched among red, blue, green and white. The lighting board 31 corresponds to a lottery field, and the emission colors of the segments 34 represent properties to be set to the segments 34. The properties, namely the emission colors, are related with highness or lowness of dividends in a predetermined game utilizing the lighting board device 30. For example, in a preferred embodiment, red represents the highest dividend, and the dividend decreases in order of blue, green and white.

Figure 5:
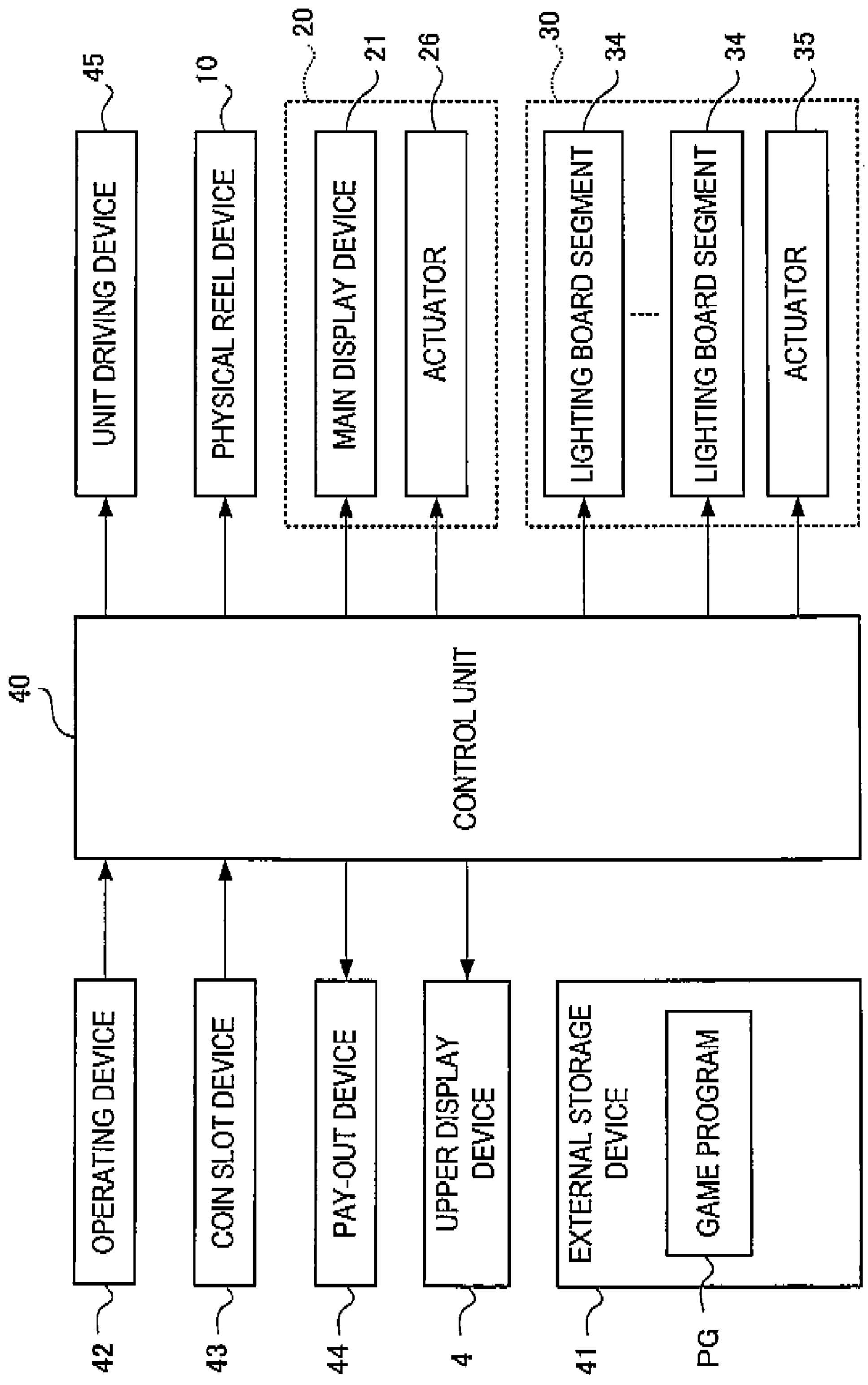
FIG. 5 is a schematic diagram illustrating a control system of the gaming machine in FIG. 1.

FIG. 5 shows a schematic diagram of a control system of the gaming machine 1. The gaming machine 1 is provided with a control unit 40. The control unit 40 is configured as a computer unit including a microprocessor as well as a main storage device and the like necessary for the operation of the microprocessor. An external storage device 41 is connected to the control unit 40. In the external storage device 41A, there is stored a game program PG necessary for the control unit 40 to control a game according to a predetermined procedure. The game program PG is loaded into the control unit 40 to thereby be executed according to the actuation of the gaming machine 1.

To the control device 1, there are connected an operating device 42, a coin slot device 43 and a pay-out device 44 of the gaming machine 1 as input devices or output devices necessary for playing a game. The operating device 42 accepts a player's various operations necessary for playing a game (for example, a betting game), and outputs a signal related with this operation to the control unit 40. The coin slot device 43 accepts dropping of coins as a price of game playing, and outputs a signal according to the number of dropped coins to the control unit 40. The pay-out device 44 pays coins as dividends in the game to the player according to an instruction from the control unit 40. The paying of the price for game playing and the dividends to be played to a player are not limited to coins. Medals or tokens may be used as a substitute for money. Alternatively, a settlement method with which a currency value or a play value can be exchanged via electronic money and another electronic information may be used.

The control unit 40 is connected to a unit driving device 45 as an object to be controlled for playing a game. The unit driving device 45 is a device that pivotally drives the center unit 3 according to an instruction from the control unit 40. Further, to the control unit 40, there are connected the upper display device 4, the physical reel device 10, the main display device 21 and an actuator 26 of the game board device 20, and the segments 34 and the actuator 35 of the lighting board device 30, respectively. The actuator 26 is an apparatus that rotates the indicator 25 of the game board device 20, and the actuator 35 is an apparatus that rotates the indicator 33 of the lighting board device 30.

An outline of the game to be played by the gaming machine 1 will be described below with reference to FIGS. 6 to 10. When the game is started, the gaming machine 1 is in a state of FIG. 1, namely, in a state in which the physical reel device 10 is brought to the front surface. When a player drops coins of a predetermined amount and performs the betting operation, the state turns to allow the game to be started. In this state, when the player 8 performs a game starting operation, a lottery game using the physical reel device 10 is played as a primary game. The lottery is similar to those of well-know slot machines. That is to say, the physical reels 11 rotate in response to the game starting operation, and the physical reels 11 stop according to a player's stop operation or without requiring the stop operation. The hits or misses are varied due to combinations of designs or the like on the stopped physical reels 11.

Figure 6:
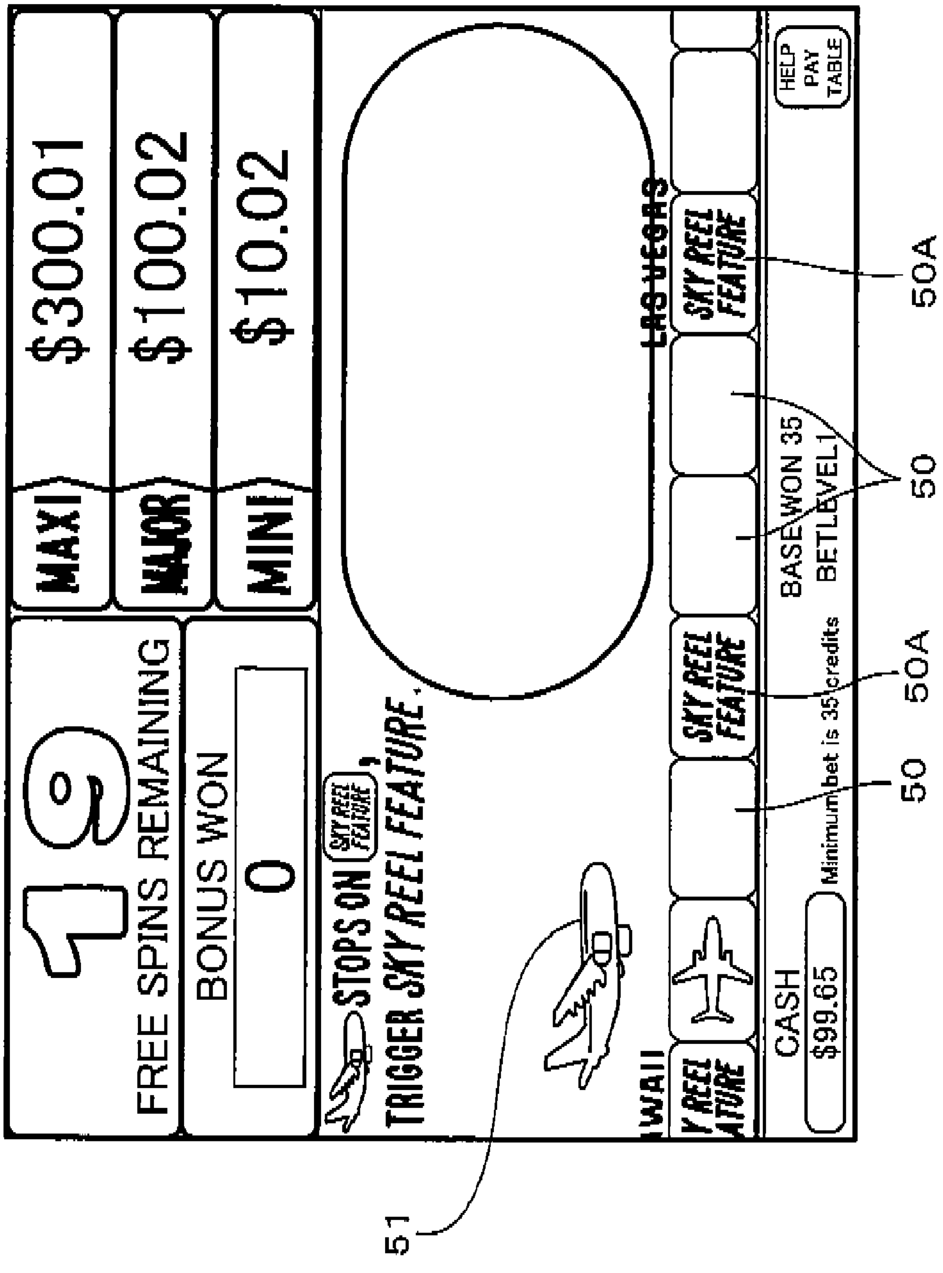
FIG. 6 illustrates a screen of a sugoroku game presented by the gaming machine of FIG. 1.

In the primary game when a predetermined combination of designs (hereinafter, it may be referred to as an winning hand) is made, a sugoroku game utilizing the upper display device 4 will be started. In the sugoroku game, as shown in FIG. 6, squares 50 are displayed on a lower portion of the upper display device 4 to form a row in the right and left direction, and a character (as one example, airplane) 51 is displayed above the line of the squares 50. Some squares 50 are set as special squares 50A, and a letter string or the like different from that on the other squares 50 is displayed on the special squares 50A in an overlapped manner. When the sugoroku game is started, the character 51 moves on the line of squares 50 to the right direction. The number of the squares 50 on which the character 51 moves changes according to details of the winning hands in the primary game. When the character 51 stops on the special square 50A, a bonus game will be started. A screen shown in FIG. 6 is displayed during the primary game.

Figure 7:
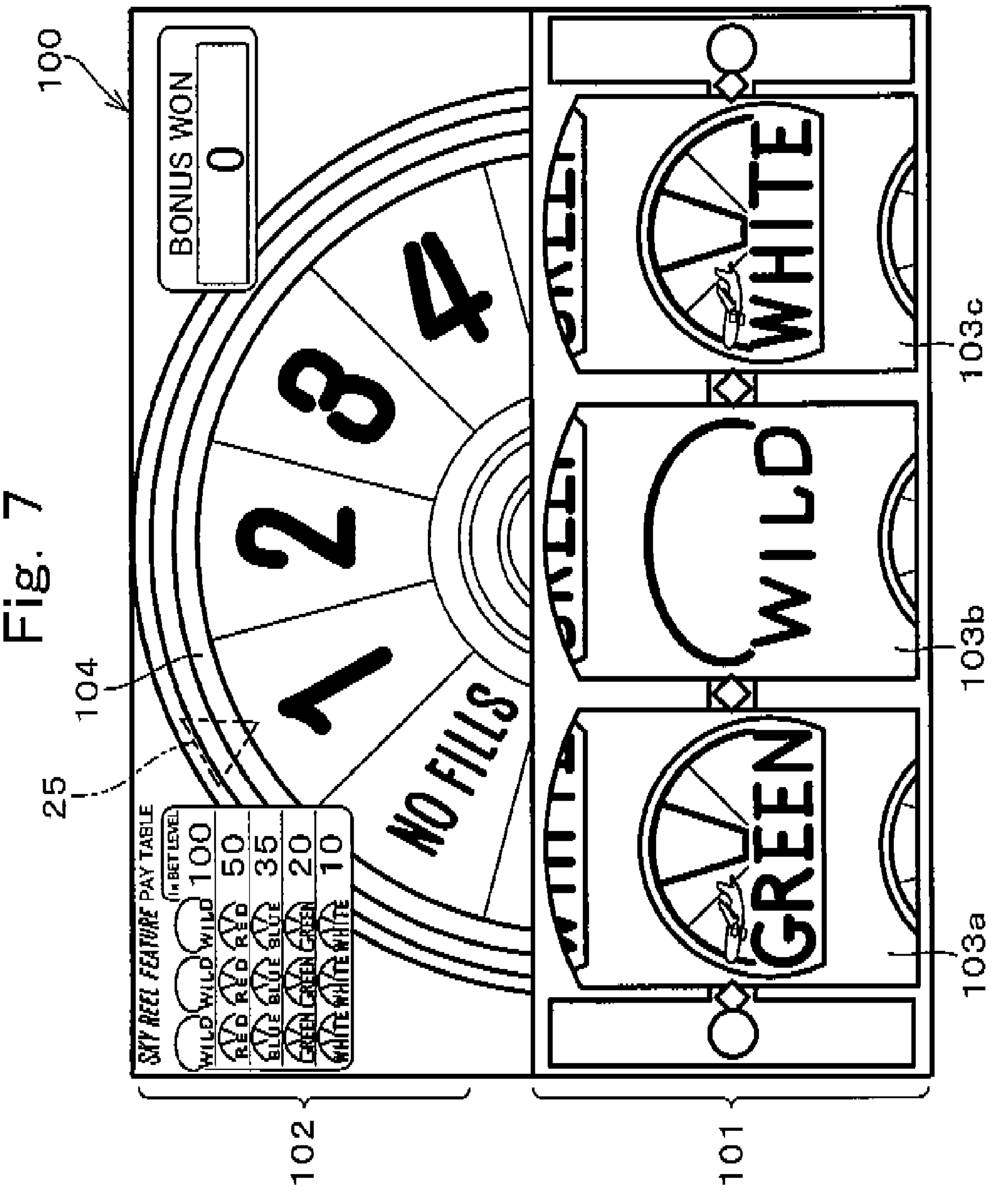
FIG. 7 illustrates a game screen of the gaming machine of FIG. 1 to be displayed on a main display device when coloration of segments on the lighting board is drawn in a lottery.
Figure 8:
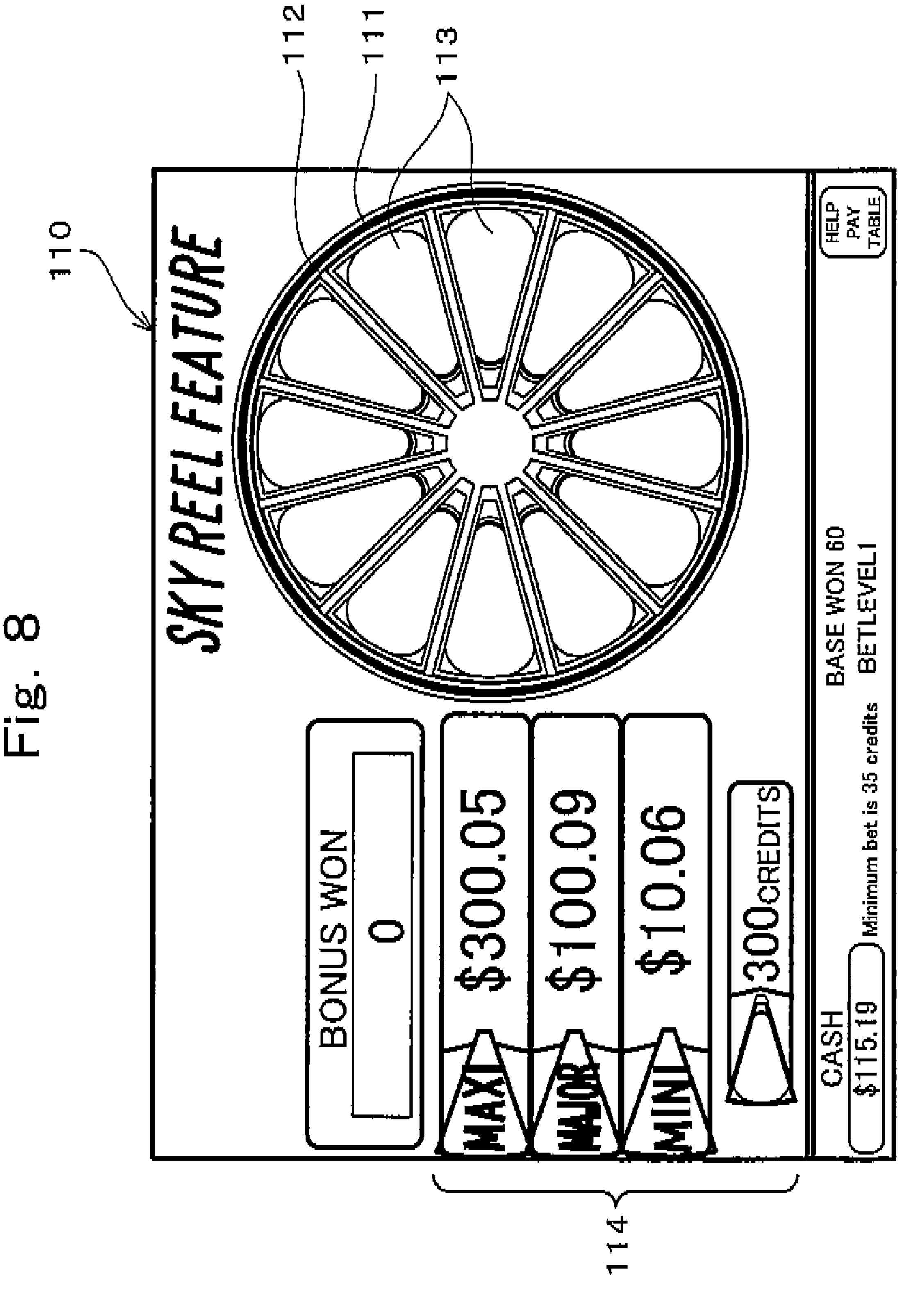
FIG. 8 illustrates a game screen to be displayed on an upper display device when the coloration of segments of the lighting board is drawn in a lottery.

When the bonus game is started, the center unit 3 pivots and the game board device 20 is brought to the front surface of the gaming machine 1. On the main display device 21 of the game board device 20A, there is displayed a game screen 100 shown in FIG. 7. On a lower half of the game screen 100 and on an upper half thereof, there are displayed a virtual reel image 101 and an upper wheel image 102, respectively. Moreover, a game screen 110 shown in FIG. 8 is displayed on the upper display device 4.

The virtual reel image 101 includes three virtual reels 103*a*, 103*b* and 103*c* (hereinafter, the may be represented by a reference symbol 103). The virtual reels 103 are ones which imitatively show physical reels through images. On the virtual reels 103, there are arranged designs including a letter string which shows anyone of "RED", "BLUE", "GREEN" and "WHITE" corresponding to the emission colors of the lighting board 31, and a design including a letter string which shows "WILD" in a predetermined arrangement. The number of designs on the virtual reels 103 may be set suitably. As one example, the number of each design including anyone of the letter strings which show "RED", "BLUE", "GREEN" and "WHITE" may be adjusted according to a reverse order of highness or lowness of the dividends in the game utilizing the lighting board device 30. That is to say, the number of the designs including the letter string "RED" is set to the smallest value, and the number of the designs increases in order of "BLUE", "GREEN" and "WHITE".

On the other hand, the upper wheel image 102 includes a semicircular wheel 104. The wheel 104 is divided into small areas, and the small areas are provided with a letter string "NO FILLS", and numerical values "1", "2", "3" and "4" from its left end towards the right end. A background color of the wheel 104 is switched among red, blue, green and white.

A border between the virtual reel image 101 and the upper wheel image 102 coincides with the bridge 23 of the upper wheel device 22, and the center of the wheel 104 accords with the pivot shaft 24 of the upper wheel device 22.

As show in FIG. 8, a lighting board image 111 is displayed on the game screen 110 at the time of the bonus game. The lighting board image 111 represents the lighting board 31. That is to say, the lighting board image 111 has a circular field 112, and the field 112 is equally divided into twelve segments 113.

Figure 9A:
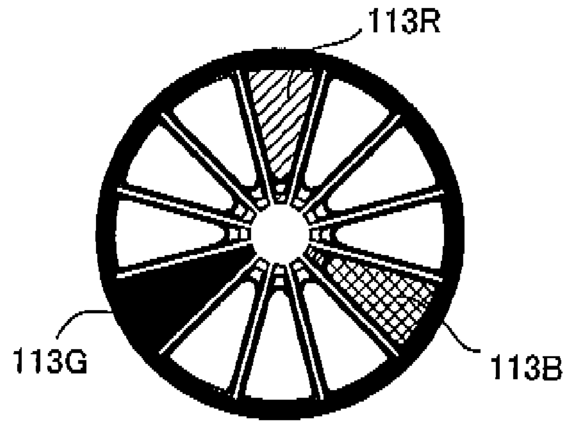
FIG. 9A is a diagram showing an initial state of a lighting board image.
Figure 9B:
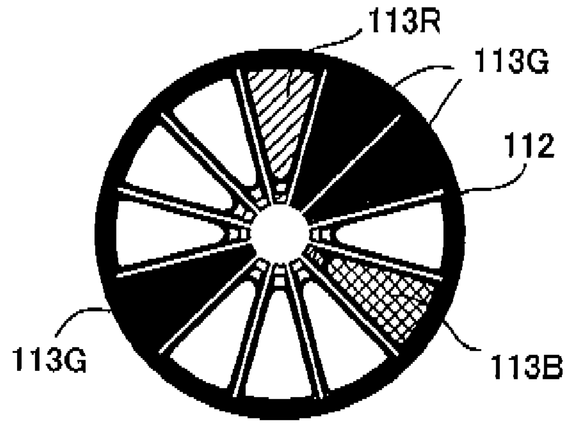
FIG. 9B is a diagram showing a state in which the lottery advances from the initial state in FIG. 9A.
Figure 9C:
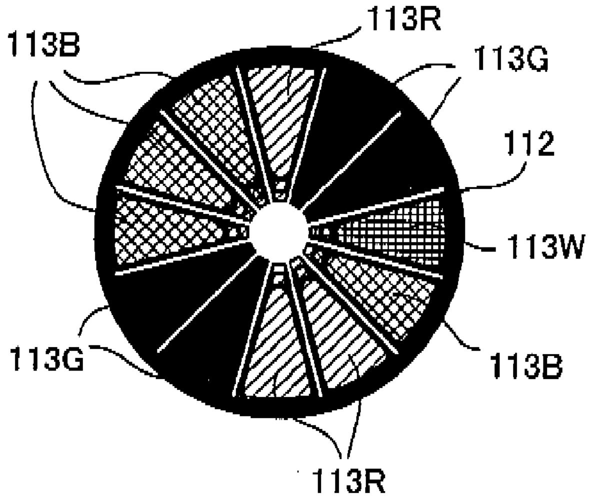
FIG. 9C is a diagram showing the lighting board image when the coloration of the segments is determined.

When the bonus game is started, as shown in FIG. 9A, the colors of red, blue, and green are given to the specific three segments 113 in the lighting board image 111, that is, the three segments 113 which are located on positions equally dividing the lighting board image 111 into three, taking tile segment 113 on the top portion of the lighting board image 111 as a criterion. This state is an initial state. In FIGS. 9A-9C, a difference in the colors of the segments 113 is shown by a difference of hatching. Hereinafter, the segment of red is denoted by a reference symbol 113R, the segment of blue is denoted by a reference symbol 113B, the segment of green is denoted by a reference symbol 113G, and the segment of white is denoted by a reference symbol 113W.

On the other hand, when the bonus game is started on the main display device 21 of the game board device 20, the virtual reels 103 are scrolled down, and thus a state in which the virtual reels 103 virtually rotate is displayed. The rotation of the virtual reels 103 is stopped at suitable timings. When all the virtual reels 103 are stopped, a selected color is determined according to the combination of designs on the virtual reels 103. The selected color is red if the three designs of “RED” appear, the selected color is blue if the three designs of “BLUE” appear, the selected color is green if the three designs of “GREEN” appear, and the selected color is white if the three designs of “WHITE” appear. If the other combinations of designs appear, it is treated as “misses”.

When the selected color is determined, the background color of the wheel 104 of the upper wheel image 102 is set to that selected color. Subsequently, the indicator 25 of the upper wheel device 22 rotates, and thereafter the indicator 25 stops at a position indicating anyone of “NO FILLS”, “1”, “2”, “3” and “4”. In FIG. 7, a state in which the indicator 25 stops at “1” is shown using an imaginary line as one example. When the indicator 25 stops at “NO FILLS”, the state returns to the lottery of the selected color utilizing the virtual reel image 101. On the other hand, when the indicator 25 stops at the position of any one of “1”, “2”, “3” and “4”, the indicated number is determined as the selected number. For example, when the indicator 25 stops at “1”, the selected number is 1. The colors of the segments 113 on the lighting board image 111 are updated according to the selected color and the selected number. For example, in the initial state shown in FIG. 9A, if the selected color is green and the selected number is 2, the two segments 113 which are counted in a clockwise direction from the segment 113R colored with red on the top portion are updated to segments 113G of green. Thereafter, the processing returns to the determination of the selected color utilizing the virtual reel image 101. The processing is repeated until the colors of all the segments 113 are determined as shown in FIG. 9C.

Figure 10:
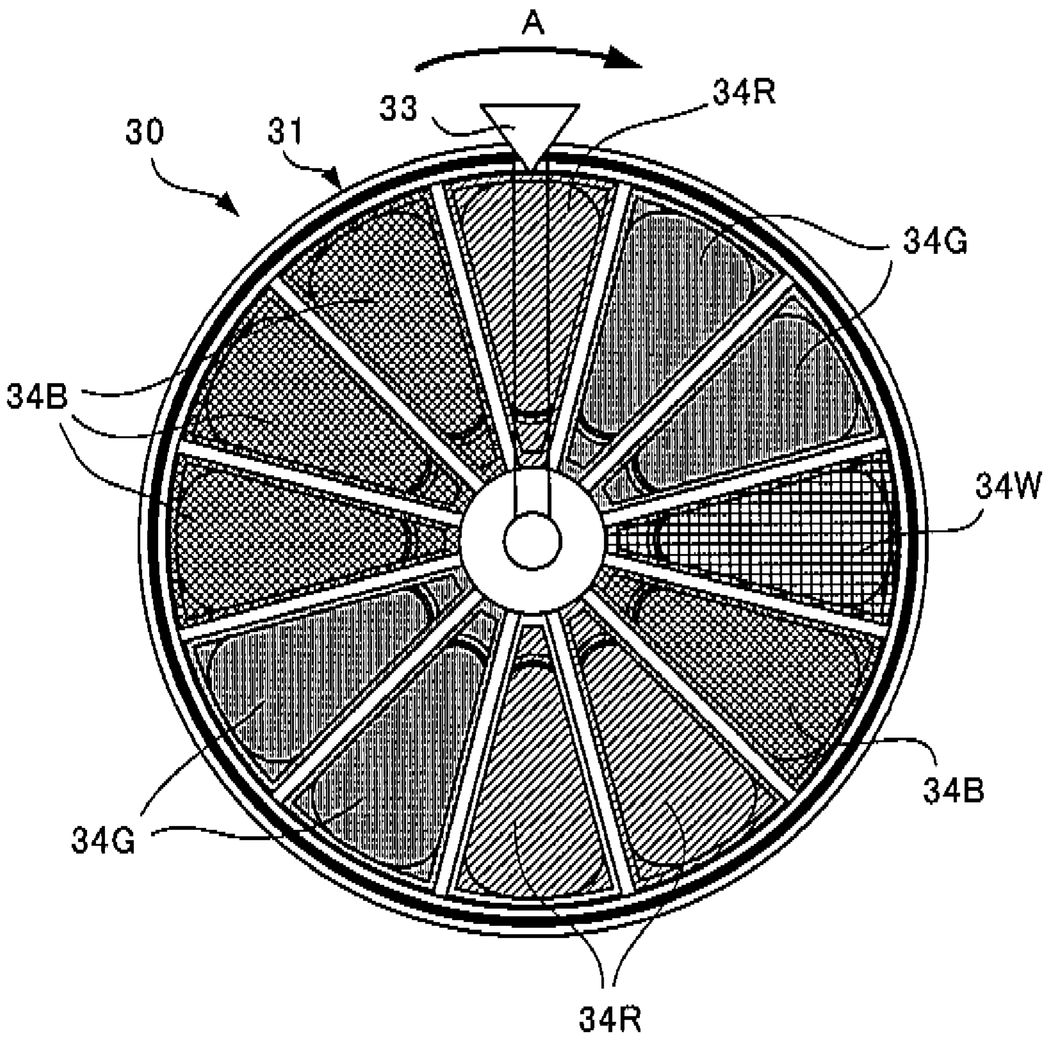
FIG. 10 is a diagram showing a state of a lottery presented by the gaming machine of FIG. 1 that utilizes the lighting board of FIG. 9C.

When the colors of all the segments 113 are determined, the center unit 3 pivots, and the lighting board device 30 is brought to the front surface of the gaming machine 1. The coloration of the field 112 on the lighting board image 111 is copied to the lighting board 31. That is to say, the emission colors of the segments 34 are controlled so that the segments 34 are colored with the same colors as those of the segments 113 according to a positional relationship between the segments 113 on the field 112 and the segments 34 on the lighting board 31. In FIG. 10, there is shown a state in which the coloration of the lighting board image 111 in FIG. 9C is copied to the lighting board 31. In FIG. 10, similarly to the example of the lighting board image 111, a difference in the emission lights of the segments 34 is illustrated by a difference in hatching, and R, B, G and W that are initial letters of the emission colors are given to the reference symbols 34.

When the coloration of the lighting board 31 is controlled, the indicator 33 of the lighting board device 30 subsequently starts to rotate in a clockwise direction as shown by an arrow A in FIG. 10. The indicator 33 stops at suitable timing. The color of one segment 34 indicated by the stopped indicator 33 becomes a winning color. When the winning color is determined, a dividend determined according to the winning color is given to the player. As one example, the dividend at this time is shown on a dividend table 114 on the left side of the game screen 110. The divided in a column “MAXI” is adopted if the winning color is red, the dividend in a column “MAJOR” is adopted if the winning color is blue, the dividend in 9 column “MINI” is adopted if the winning color is green, and the dividend shown by “300CREDITS” in a bottom column is given if the winning color is white. As to aforementioned dividend, the dividend of 300 coins is given.

Figure 11:
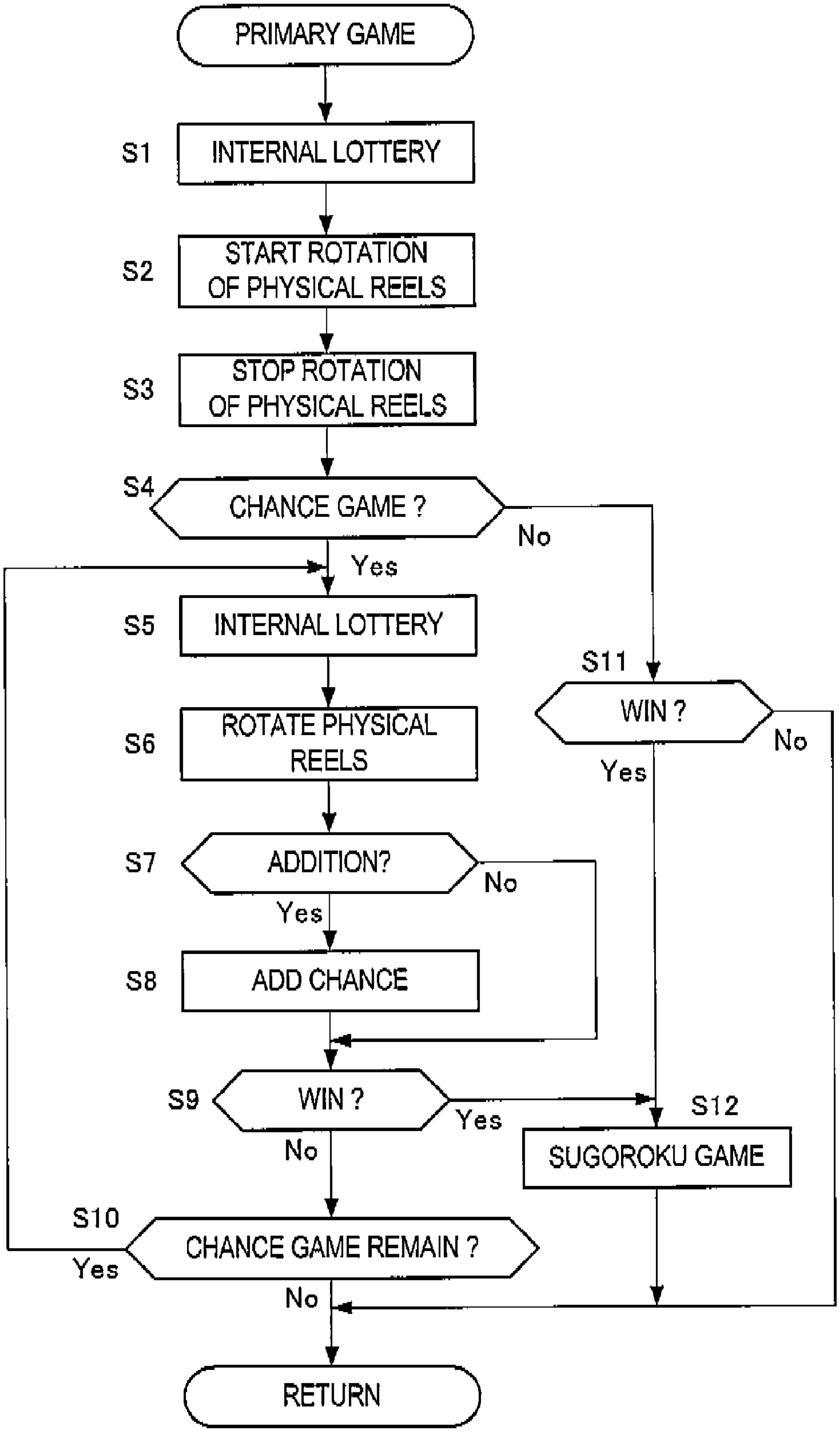
FIG. 11 is a flowchart showing a primary game routine of the gaming machine of FIG. 1.

Next, various operations to be executed by the control unit 40 in order to realize the above games will be described below with reference to FIGS. 11 to 14. FIG. 11 shows a primary game routine to be performed by the control unit 40 in order to realize the primary game. The control unit 40 starts the routine in response to the instruction for starting the game. At step S1, the control unit 40 performs an internal lottery relating to the lottery result of the physical reel device 10. That is to say, the control unit 40 selects a combination of designs to be drawn in the lottery at the time when the physical reels 11 stop. At subsequent step S2, the control unit 40 starts the rotation of the physical reels 11, and then stops the physical reels 11 at next step S3 so that the combination of the designs determined by the internal lottery can be obtained. When the player’s stopping operation meets certain requirements, an exception that 9 combination of designs other than the internal lottery result is obtained may be allowed.

At the next step S4, the control unit 40 determines whether the combination of the designs on the stopped physical reels 11 is a combination for permitting a chance game. When the combination for permitting the chance game is obtained, the control unit 40 goes to step S5 to start the chance game. The chance game is a game that, when being once permitted, repeats lottery at the predetermined number of times (as one example, 10 times), namely, repeats the rotation and stopping of the physical reels 11. At step S5, the control unit 40 performs the internal lottery relating the combination of designs on the physical reels 11. Subsequently, the control unit 40 goes to step S6 to rotate and stop the physical reels. Thereafter, the control unit 40 goes to step S7, and determines whether the combination obtained at step S6 is a combination for permitting addition the chance game. When it is the combination for permitting the addition, the control unit 40 goes to step S8 to add the predetermined number of times to the remaining number of lotteries in the chance game, and then goes to step S9. When the determination is negative at step A7, the control unit 40 skips step S8 and goes to step S9.

At step S9, the control unit 40 determines whether the combination of designs on the physical reels 11 (the state stopped at step S6) is a predetermined winning hand. When it is not the winning hand, the control unit 40 goes to step S10 to determine whether the lotteries in the chance game remain.

When some lotteries remain, the control unit 40 returns to step S5, and when no lottery remains, the primary game routine is ended.

When the winning hand is established at step S9, the control unit 40 goes to step S12 to shift the game to the sugoroku game. In this case, the control unit 40 informs the player of the starting of the sugoroku game. Thereafter, the control unit 40 ends the primary game routine. Further, if the starting of the chance game is not permitted at step S4, the control unit 40 goes to step S11, and determines whether the winning hand is established. When the winning hand is established, the control unit 40 goes to step S12, and when not established, the control unit 40 ends the current primary game routine.

Figure 12:
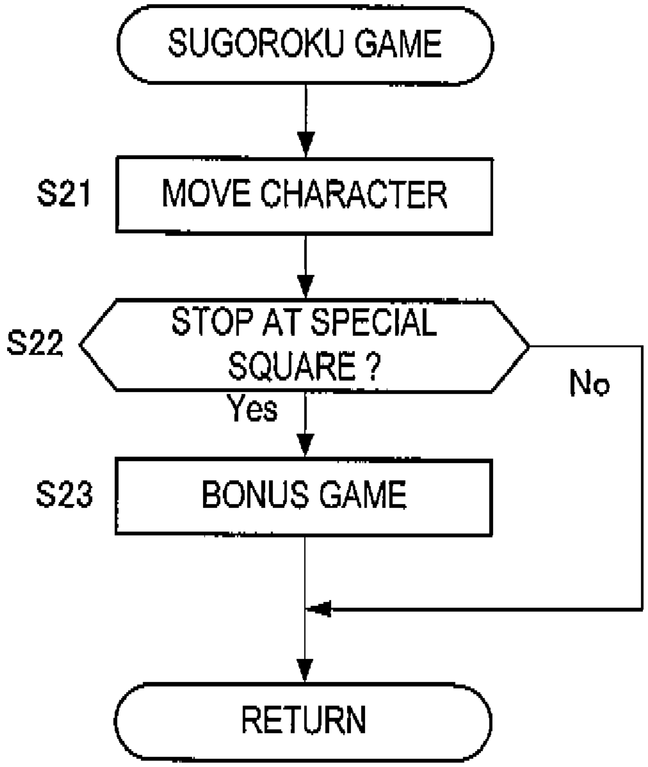
FIG. 12 is a flowchart showing a sugoroku game routine.

When the game is shifted to the sugoroku game at step S12 in FIG. 11, the control unit 40 starts the sugoroku game routine in FIG. 12 subsequent to the routine in FIG. 11. In the sugoroku game routine, first of all, the control unit 40 moves the character 51 displayed on the upper display device 4 at step S21. The moving amount changes according to the winning hands. At subsequent step S22, the control unit 40 determines whether the character 51 stops on the special square 50A. When the character 51 stops on the special square 50A, the control unit 40 goes to step S23, and shifts the game to a bonus game. In this case, the control unit 40 informs the player of the starting of the bonus game, and then pivots the center unit 3 so that the game board device 20 is brought to the front surface of the gaming machine 1. Further, the display on the upper display device 4 is switched into the game screen 110 in FIG. 8.

Thereafter, the control unit 40 ends the sugoroku game routine. On the other hand, if the determination at step S22 is negative, the control unit 40 skips step S23 and ends the sugoroku game routine. For example, the following processing may be added to the sugoroku game routine. In this processing, a square for permitting re-lottery using the physical reel 11 are provided, and when the character 51 stops at that square, the lottery by the physical reel 11 is again performed, so that the character 51 is further moved according to the lottery result.

Figure 13:
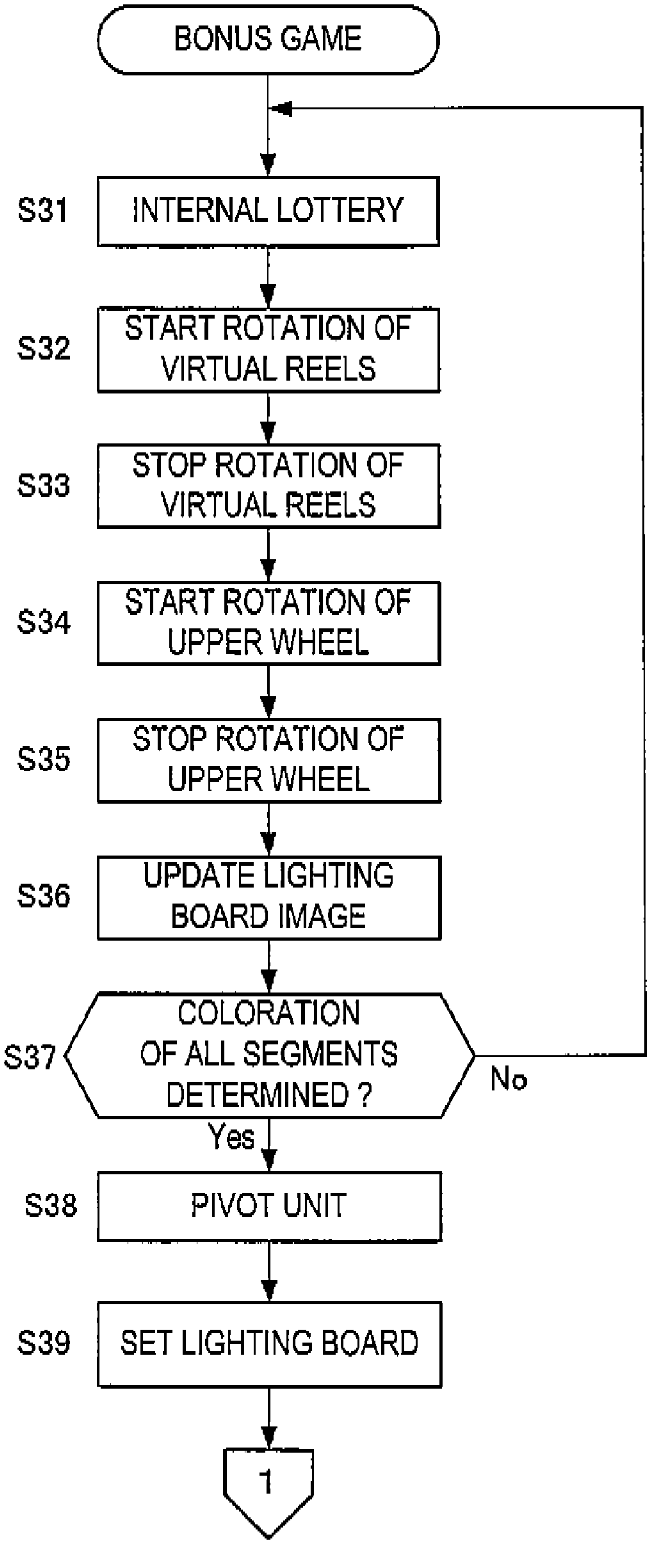
FIG. 13 is a flowchart showing a bonus game routine.
Figure 14:
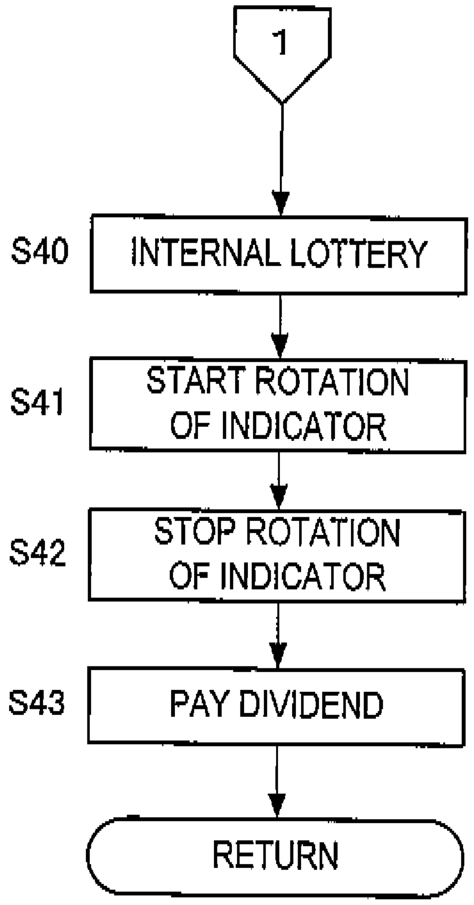
FIG. 14 is a flowchart of operations subsequent to the bonus game routine of FIG. 13.

When the game is shifted to the bonus game at step S23 in FIG. 12, the control unit 40 starts the bonus game routine in FIG. 13 subsequent to the routine in FIG. 12. In the bonus game routine, first of all, the control unit 40 performs internal lotteries relating to the lottery of a selected color utilizing the virtual reels 103 and the lottery of a selected number utilizing the upper wheel device 22 at step S31. That is to say, the control unit 40 performs a lottery of a combination of designs at the time when the virtual reels 103 stops and a stop position of the indicator 25. In this case, the combination of designs on the virtual reels 103 may be random. On the other hand, the lottery relating to the selected number is desirably controlled so that as the selected number is larger, probability becomes smaller.

At next step S32, the control unit 40 starts the rotation (scroll) of the virtual reels 103, then continues the rotation of the virtual reels 103 for a while at subsequent step S33, and thereafter, stops the virtual reels 103 so that the combination of the designs determined by the internal lottery can be obtained. After that, the control unit 40 goes to step S34 to start the rotation of the indicator 25 of the upper wheel device 22 indicated as "START ROTATION OF UPPER WHEEL" in FIG. 13, and stops the indicator 25 at next step S35 indicated as "STOP ROTATION OF UPPER WHEEL." The stopped position of the indicator 25 accords with one determined at step S31. The order of processing may be interchanged between the set of steps S32 and S33 and the set of steps S34 and S35. When the indicator 25 stops, the control unit 40 goes to step S36, and updates the lighting board image 11 according to the selected color and the selected number determined at step S31. The updating is performed as shown in FIGS. 9A and 9B. When the lottery result in the upper wheel device 22 is "NO FILLS", the updating of the lighting board image 111 is omitted.

At the next step S37, the control unit 40 determines whether the coloration of all the segments 113 of the lighting board image 111 is determined. When the segments 113 whose colors are not determined remain, the control unit 40 returns to a process of step S31. When the colors of all of the segments 113 are determined as shown in FIG. 9C, the control unit 40 goes to step S38, and pivots the center unit 3 so that the lighting board device 30 is brought to the front surface of the gaming machine 1. The control unit 40 subsequently goes to step S39, and sets the emission colors on the lighting board 31 to coincide with those on the lighting board image 111.

In this case, an effect may be provided so that the colors of the segments 113 on the lighting board image 111 are transferred to the segments on the lighting board 31. For example, the effect may be configured such that each color on the lighting board image 111 disappears each time the color of the segment 34 lights, or such that a video image appears in which the segments 113 are transformed into lumps of colors or coins and they move in the game screen 110 toward the lighting board 31. When the setting of the emission colors of the lighting board 31 is completed at step S39, the control unit 40 goes to step S40 in FIG. 14.

At step S40, the control unit 40 performs the internal lottery relating to the stopped position of the indicator 33. In this internal lottery, for example, a winning color is first determined, and then the stopped position is determined so that the indicator 33 stops on the segment 34 with the winning color. The determination of the winning color is adjusted so that probability of selecting higher dividends becomes lower. After the internal lottery, the control unit 40 goes to step S41, and starts the rotation of the indicator 33. At a subsequent step S42, the control unit 40 continues the rotation of the indicator 33 for a while, and stops the indicator 33 on the stopped position determined by the internal lottery. Thereafter, the control unit 40 pays a dividend according to the winning color to the player. At this time, an effect according to the highness or lowness of the dividend is produced. When the paying of the dividend is completed, the control unit 40 ends the bonus game routine.

According to the above described gaming machine 1, since the property (color) of each segment 34 on the lighting board 31 is determined by the game utilizing the game board device 20, a percentage of the colors at the time of the lottery using the lighting board 31 is suitably changed. For this reason, the player's expectation for the game can be changed. For example, when the number of the red segments 34R whose dividend is the highest increases, the player's expectation is increased. The selection of the color of each segment 34 on the lighting board 31 and the selection of the number are performed separately, and the selection is repeated in order to determine the colors of all the segments 34. For this reason, player's interest is attracted to the color determining steps, thereby heightening the entertainment of the game. A plurality of selections are permitted for the selection of one color, and the colors are sequentially determined starting from a predetermined position of the lighting board 31. For this reason, the segments 34 whose colors are uniform may continue on the lighting board 31. As a result, for example, the range of the red segments whose dividend is high is enlarged, thereby further heightening the player's expectation. Even though the segments with the same color do not continue, if the color with high dividend appears a lot, the player's expectation can be increased. In the initial state, the properties of three segments are fixed to red, blue and green, and thus even if a specified color is continuously selected in the selection of the color and the number, the color imbalance can be moderately repressed. As a result, a moderate restraining effect can be produced in order to prevent simplification of the lottery utilizing the lighting board 31.

In the gaming machine 1, the lighting board 31 corresponds to the lottery field, each segment 34 on the lighting board 31 corresponds to the option area, and the properties of the segments 34 are visually distinguished by the colors. The control unit 40 of the gaming machine 1 serves as a first lottery device by repeating the processing at step S31 in FIG. 13, particularly serves as a first selecting device by determining the selected color at step S31, serves as a second selecting device by determining the selected number at step S31, serves as a first presenting device by performing the processing at steps S32 to S36 and S39, serves as a selection state presenting device by performing the processing at steps S32 to S35, and serves as an arrangement procedure presenting device by performing the processing at step S36. Further, the control unit 40 serves as a second lottery device by performing the processing at step S40 in FIG. 14, serves as a second presenting device by performing the processing at steps S41 and S42, and serves as a dividend control device by performing the processing at step S43.

The present invention is not limited to the above embodiment, and can be suitably modified. For example, when the game board device 20 and the lighting board device 30 can be visually recognized simultaneously, the display of the lighting board image may be omitted, and the procedure for determining the properties of the segments may directly be displayed on the lighting board. The lottery field is not limited to a circular one, and any shape may be adopted as long as the lottery field can be divided into a plurality of option areas. The property set to the option area is not entirely limited to one for permitting paying of dividends, and "miss" that means the dividend is not paid may be set as one kind of properties. Only two kinds of properties including "hits" and "misses" are prepared, the first lottery device may determine an arrangement of the option areas with the hits property and the option areas with the misses property by means of one lottery or a plurality of lotteries. The arrangement of each of the option areas may be determined in the lottery such that the color to be assigned to each segment is drawn in the lottery for each segment to thereby determine the colors of all the option areas. The lottery field is not limited to the example that the lottery field is divided into a plurality of segments in advance. For example, the first lottery device selects a percentage of a plurality of option areas on the lottery field, the lottery field may be divided according to the percentage, and a plurality of option areas may be allowed to appear. The properties are not limited to the example of distinguishing according to the colors, and the properties may be distinguished according to patterns, characters and another designs. The lottery by means of the second lottery device is not limited to the example using the indicator, and a suitable lottery method may be adopted.

What is claimed is:

1. A gaming machine comprising:

a first lottery device which performs a lottery to determine an arrangement of each of option areas with different properties on a lottery field to be presented to a player;

a first presenting device which presents to the player the arrangement of each of the option areas determined in the lottery by the first lottery device;

a second lottery device which performs a lottery to draw a lottery position on the lottery field in a state where the arrangement of each of the option areas is determined by the first lottery device;

a second presenting device which presents to the player a state where the lottery position is determined based on a result of the lottery by the second lottery device; and a dividend control device which gives to the player a dividend corresponding to a property of an option area, said property of the option area being configured to yield the dividend and said option area satisfying a predetermined relationship with the lottery position drawn by the second lottery device, wherein the lottery field is divided into a plurality of segments in advance, and the first lottery device selects a property to be set to at least part of the segments from the properties of the option areas to thereby perform the lottery of the arrangement of each of the option areas, the first lottery device has a first selecting device which selects the property and a second selecting device which selects a number of segments in which the property selected by the first selecting device is to be arranged, and the first lottery device performs the lottery to arrange each of the option areas by selecting segments of which a number corresponds to the number selected by the second selecting device from the plurality of segments, and by setting to the selected segments the property which is selected by the first selecting device.

2. The gaming machine according to claim 1, wherein the first lottery device repeats a selection of the property by the first selecting device and a selection of the number by the second selecting device until the properties of all the segments are determined.

3. The gaming machine according to claim 1, wherein the plurality of segments are arranged in a predetermined direction on the lottery field, and the first lottery device selects the segments of which the number corresponds to the number selected by the second selecting device according to an arranging order of the plurality of segments.

4. The gaming machine according to claim 1, wherein the first presenting device presents to the player a state where the property is selected by the first selecting device and the number is selected by the second selecting device, in addition to the arrangement of each of the option areas determined in the lottery by the first lottery device.

5. The gaming machine according to claim 1, wherein, the first lottery device repeats a selection of the property by the first selecting device and a selection of the number by the second selecting device until the properties of all the segments are determined, and the first presenting device comprises a selection condition presenting device which presents to the player a state where the property is selected by the first selecting device and the number is selected by the second selecting device, and an arrangement procedure presenting device which presents to the player a procedure for sequentially determining the properties of the plurality of segments on the lottery field according to a repetition of selections by the first selecting device and the second selecting device such that the properties of the plurality of segments are disposed next to each other.

6. The gaming machine according to claim 5, wherein the arrangement procedure presenting device presents the procedure for sequentially determining the properties of the plurality of segments on a field image corresponding to the lottery field.

7. The gaining machine according to claim 6, wherein, when the properties of all the segments are determined, the first presenting device presents each of the segments on the lottery field in a visually distinguishable manner according to the property of each segment on the field image to thereby present to the player the arrangement of each of the option areas.

8. The gaming machine according to claim 1, wherein the property of part of the plurality of segments is fixed, and the first lottery device selects other properties of segments except for the part of the plurality of segments.

9. The gaming machine according to claim 1, wherein the first presenting device presents the properties of the segments arranged on the lottery field in a visually distinguishable manner.

10. The gaining machine according to claim 9, wherein the properties of the option areas are distinguishable according to colors or designs.

11. The gaining machine according to claim 9, wherein, when the lottery position drawn by the second lottery device is within one of the option areas for which the property is configured to yield the dividend, the dividend control device determines that the predetermined relationship is satisfied and gives to the player the dividend corresponding to the property of the option area where the relationship is satisfied.

12. The gaining machine according to claim 1, wherein the lottery field has a circular shape, and the plurality of segments are arranged in a peripheral direction of the lottery field.

13. A method for determining a dividend of a gaming machine, comprising:

a first lottery step of performing a lottery to determined an arrangement of each of option areas with different properties on a lottery field to be presented to a player;

a first presenting step of presenting to the player the arrangement of each of the option areas determined in the lottery at the first lottery step;

a second lottery step of performing a lottery to draw a lottery position on the lottery field in a state where the arrangement of each of the option areas is determined at the first lottery step;

a second presenting step of presenting to the player a state where the lottery position is determined based on a result of the lottery at the second lottery step; and a dividend control step of giving to the player a dividend corresponding to a property of an option area, said property of the option area being configured to yield the dividend and said option area satisfying a predetermined relationship with the lottery position drawn at the second lottery step, wherein the lottery field is divided into a plurality of segments in advance, and the first lottery device selects a property to be set to at least part of the segments from the properties of the option areas to thereby perform the lottery of the arrangement of each of the option areas, the first lottery device has a first selecting device which selects the property and a second selecting device which selects a number of segments in which the property selected by the first selecting device is to be arranged, and the first lottery device performs the lottery to arrange each of the option areas by selecting segments of which a number corresponds to the number selected by the second selecting device from the plurality of segments, and by setting to the selected segments the property which is selected by the first selecting device.

14. A computer-readable medium having stored thereon instructions executable by a computer of the a gaming machine, the instructions instructing the gaming machine to operate as:

a first lottery device which performs a lottery to determine an arrangement of each of option areas with different properties on a lottery field to be presented to a player;

a first presenting device which presents to the player the arrangement of each of the option areas determined in the lottery by the first lottery device;

a second lottery device which performs a lottery to draw a lottery position on the lottery field in a state where the arrangement of each of the option areas is determined by the first lottery device;

a second presenting device which presents to the player a state where the lottery position is determined based on a result of the lottery by the second lottery device; and a dividend control device which gives to the player a dividend corresponding to a property of an option area, said property of the option area being configured to yield the dividend and said option area being a predetermined relationship with the lottery position drawn by the second lottery device, wherein the lottery field is divided into a plurality of segments in advance, and the first lottery device selects a property to be set to at least part of the segments from the properties of the option areas to thereby perform the lottery of the arrangement of each of the option areas, the first lottery device has a first selecting device which selects the property and a second selecting device which selects a number of segments in which the property selected by the first selecting device is to be arranged, and the first lottery device performs the lottery to arrange each of the option areas by selecting segments of which a number corresponds to the number selected by the second selecting device from the plurality of segments, and by setting to the selected segments the property which is selected by the first selecting device.

* * * * *